Feb. 13, 1945.  E. H. SANDBERG  2,369,609
CASTER
Filed Oct. 27, 1943

Inventor
Ernest H. Sandberg
By
Attorneys

Patented Feb. 13, 1945

2,369,609

UNITED STATES PATENT OFFICE 2,369,609

CASTER

Ernest H. Sandberg, Long Beach, Calif.

Application October 27, 1943, Serial No. 507,825

9 Claims. (Cl. 16—21)

This invention is a novel improvement in casters for furniture or the like; and the principal object of the invention is to provide a caster in which the wheel carrying yoke is swiveled on the stem of the caster by anti-friction bearings including an upper ball bearing which carries the lateral thrust caused by the offset of the wheel, and including a lower ball bearing which carries the load or weight and by reason of its lower position on the stem makes the caster swivel with great ease.

Other objects of the invention are to provide a caster of the above type embodying certain novel features of construction hereinafter set forth.

I will explain the invention with reference to the accompanying drawing, which illustrates one practical embodiment thereof to enable others to adopt and use the same; and will summarize in the claims the novel features of construction and novel combinations of parts, for which protection is desired.

Figure 1:
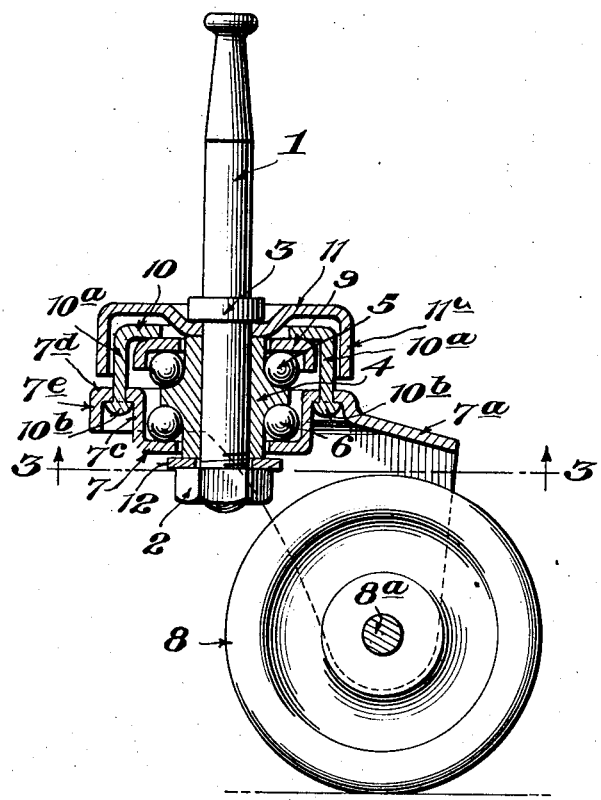
Fig. 1 is a vertical section through the caster.
Figure 2:
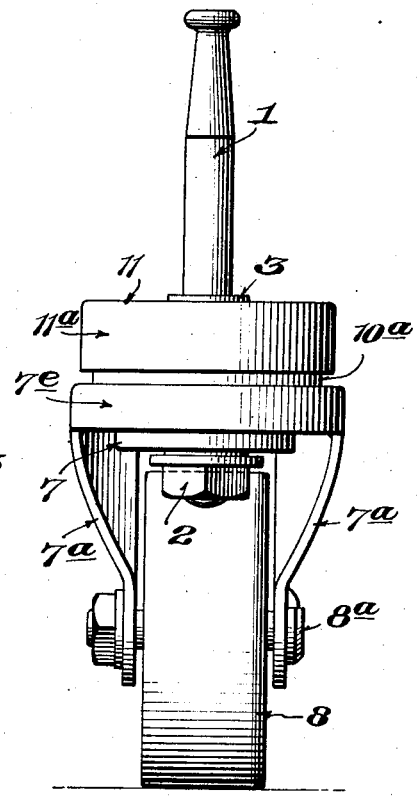
Fig. 2 is an end view thereof.

As shown, the caster comprises a stem 1 having a threaded lower end receiving a washer 12 and nut 2, said stem having thereon an annular flange 3 spaced from the lower end thereof for the purpose hereinafter described.

Upon the stem 1 between shoulder 3 and washer 12 is a double ball cone 4 for the upper ball bearings 5 and the lower ball bearings 6, the lower ball bearing 6 also riding upon an underlying ball race 7 formed integrally with a yoke 7a in which the caster wheel 8 is journaled on axle bolt 8a in the usual manner, said ball race 7 being substantially cup-shaped as shown and having an axial opening for the passage therethrough of the lower end of cone 4, the portion adjacent said opening underlying the lower ball bearings 6, and having a cylindrical portion 7c surrounding the lower portion of the cone 4 spaced from the balls 6, the upper end of cylindrical portion 7c being flanged outwardly as at 7d and further flanged downwardly as at 7e.

Figure 3:
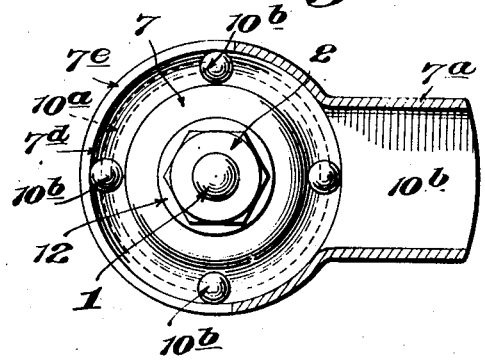
Fig. 3 is a horizontal section on the line 3—3, Fig. 1.

A hardened ball retainer 9 is disposed above the upper ball bearings 5 and forms the upper race therefor, said retainer 9 being maintained in fixed relation with respect to the balls 5, cone 4, and ball race 7, by means of disk-like member 10 having a central opening through which the stem 1 passes, said member 10 seating upon the top of ball retainer 9 and having a plurality of downwardly extending tongues 10a, four being shown in Fig. 3, which extend through holes in the annular flange 7d of the race 7, the same being riveted thereto as at 10b, whereby the parts 4 to 10 inclusive are securely locked together to form a unit which is removable from and mountable on the stem 1.

Above the yoke 10 is a dust cap 11 preferably of inverted cup-shape, the same having a central opening through which the stem 1 passes, the upper face of dust cap 11 contacting the lower end of the annular shoulder 3 of the stem, as clearly shown in Fig. 1, said dust cap 11 having cylindrical side walls 11a surrounding the member 10 and extending down and terminating slightly above the annular flange 7d of ball race 7.

In assembling the device, the nut 2 and washer 12 being removed from the stem 1, dust cap 11 is first slipped onto the lower end of stem 1 and pushed upwardly until it contacts the lower end of shoulder 3; then the unit 4–10 inclusive which includes the yoke 7a and caster wheel 8 is slipped onto the lower end of the stem and pushed upwardly until it contacts the underside of dust cap 11, whereupon washer 12 and nut 2 are applied to the lower end of the stem to clamp the ends of cone 4 between the washer 12 and dust cap 11.

Owing to the above construction the lower ball bearings 6 which ride upon the ball race 7 carry the load, and as the balls 6 are disposed only slightly above the top of the offset caster wheel 8 the weight of the furniture or other article upon the stem 1 reacting upon ball race 7 will place the load at a point substantially opposite the top of the caster wheel and thereby cause the caster to swivel very easy. The upper ball bearings 5 merely take care of lateral thrust caused by the offsetting of the caster wheel 8.

I do not limit my invention to the exact form shown in the drawing, for obviously changes may be made therein within the scope of the claims.

I claim:

1. A caster, comprising a stem; a double ball cone on said stem adjacent its lower end; means for retaining the cone thereon; upper and lower ball bearings engaging said double cone; a ball race underlying the lower ball bearing and having an external annular stiffening flange; a yoke carried by said ball race offset from said stem; a wheel journaled in said yoke; a ball retainer overlying the upper ball bearing; and means carried by the flange for securing the retainer and ball race together, the lower ball bearing carrying the load and the upper ball bearing carrying the lateral thrust due to the offset wheel.

2. In a caster as set forth in claim 1; said securing means comprising a member having an opening receiving the stem and having depending tongues passing through perforations in the ball race and anchored therein, whereby the race, cone, retainer, balls and yoke will form a unit.

3. A caster, comprising a stem having an annular shoulder adjacent its lower end; a double ball cone on said stem below the shoulder; means for retaining the cone thereon; upper and lower ball bearings engaging said double cone; a ball race underlying the lower ball bearing and having an external annular stiffening flange; a yoke carried by said ball race offset from said stem; a wheel journaled in said yoke; a ball retainer overlying the upper ball bearing; and means carried by the flange for securing the retainer and ball race together, the lower ball bearing carrying the load and the upper ball bearing carrying the lateral thrust due to the offset wheel.

4. In a caster as set forth in claim 3, said securing means comprising a member having an axial opening receiving the stem and having depending tongues passing through perforations in the ball race and riveted thereto, whereby the race, cone, retainer, balls and yoke will form a unit.

5. A caster, comprising a stem having an annular shoulder adjacent its lower end; a double ball cone on said stem below the shoulder; means for retaining the cone thereon; upper and lower ball bearings engaging said double cone; a ball race underlying the lower ball bearing and having an external annular stiffening flange; a yoke carried by the ball race offset from said stem; a wheel journaled in said yoke; a ball retainer overlying the upper ball bearings; and a member embracing the retainer and secured to the flange of the ball race for securing the same together, whereby the lower ball bearing will carry the load and the upper ball bearing will carry the lateral thrust due to the offset wheel.

6. In a caster as set forth in claim 5, said member comprising a disk having an axial opening receiving the stem and having depending tongues passing through perforations in the ball race and riveted thereto, whereby the race, cone, retainer, balls and yoke will form a unit.

7. In a caster, a removable unit comprising a double ball cone having a bore; upper and lower ball bearings engaging said double cone; a ball race underlying the lower ball bearings; a yoke carried by the ball race and offset therefrom; a wheel journaled in said yoke; a ball retainer overlying the upper ball bearing; a member having an axial opening registering with said bore and having depending tongues passing through perforations in the ball race and secured thereto, whereby the race, cone, retainer, balls and yoke will form a unit.

8. In a caster, a removable unit comprising a double ball cone having a bore; upper and lower ball bearings engaging said double cone; a ball race underlying the lower ball bearing and having an external annular stiffening flange; a yoke carried by the ball race and offset therefrom; a wheel journaled in said yoke; a ball retainer overlying the upper ball bearing; and a member embracing the retainer and secured to the flange of the ball race for securing the parts together.

9. In a caster as set forth in claim 8; said member comprising a disk having an axial opening registering with said bore and having depending tongues passing through perforations in the ball race and riveted thereto, whereby the race, cone, retainer, balls and yoke will form a unit.

ERNEST H. SANDBERG.